United States Patent
Gong et al.

(10) Patent No.: US 10,851,656 B2
(45) Date of Patent: Dec. 1, 2020

(54) MULTILAYER ENVIRONMENTAL BARRIER COATING

(71) Applicants: Rolls-Royce Corporation, Indianapolis, IN (US); Rolls-Royce PLC, London (GB)

(72) Inventors: Stephanie Gong, Indianapolis, IN (US); Taylor K. Blair, Indianapolis, IN (US); Ngunjoh Lawrence Ndamka, Derby (GB); Li Li, Carmel, IN (US); Sunny Chang, Carmel, IN (US); Ann Bolcavage, Indianapolis, IN (US)

(73) Assignees: Rolls-Royce Corporation, Indianapolis, IN (US); Rolls-Royce PLC, London (GB)

( * ) Notice: Subject to any disclaimer, the term of this patent is extended or adjusted under 35 U.S.C. 154(b) by 0 days.

(21) Appl. No.: 16/141,803

(22) Filed: Sep. 25, 2018

(65) Prior Publication Data
US 2019/0093498 A1    Mar. 28, 2019

Related U.S. Application Data

(60) Provisional application No. 62/563,891, filed on Sep. 27, 2017.

(51) Int. Cl.
*C04B 41/52* (2006.01)
*F01D 5/28* (2006.01)
(Continued)

(52) U.S. Cl.
CPC ............ *F01D 5/288* (2013.01); *C04B 41/524* (2013.01); *C04B 41/526* (2013.01); *C04B 41/89* (2013.01);
(Continued)

(58) Field of Classification Search
CPC . B32B 18/00; C04B 41/52–526; C04B 41/89; C04B 41/5024; C04B 41/5045;
(Continued)

(56) References Cited

U.S. PATENT DOCUMENTS 3,962,059 A   6/1976   Kaup et al.
3,964,877 A   6/1976   Bessen et al.
(Continued)

FOREIGN PATENT DOCUMENTS

CA   2712248 A1   7/2009
EP   0972853 A1   1/2000
(Continued)

OTHER PUBLICATIONS

Anderson et al., "Ultrasonic Measurement of the Kearns Texture Factors in Zircaloy, Zirconium, and Titanium," Metallurgical and Materials Transactions, vol. 30A, Aug. 1999, 8 pp.
(Continued)

*Primary Examiner* — Z. Jim Yang
(74) *Attorney, Agent, or Firm* — Shumaker & Sieffert, P.A.

(57) ABSTRACT

An article includes a substrate, a bond coat on the substrate, and a multilayer environmental barrier coating (EBC) on the bond coat. The multilayer EBC includes a first EBC layer defining a first thickness and a second EBC layer defining a second thickness. The first EBC layer includes a first rare earth disilicate and a first concentration of a sintering aid that includes alumina. The second EBC layer includes a second rare earth disilicate and a second concentration of the sintering aid that includes alumina, less than the first concentration of the sintering aid.

18 Claims, 3 Drawing Sheets

(51) Int. Cl.
  *C23C 28/04* (2006.01)
  *C23C 28/00* (2006.01)
  *F01D 25/00* (2006.01)
  *C04B 41/89* (2006.01)

(52) U.S. Cl.
  CPC .......... *C23C 28/042* (2013.01); *C23C 28/322* (2013.01); *C23C 28/34* (2013.01); *C23C 28/345* (2013.01); *C23C 28/3455* (2013.01); *F01D 25/007* (2013.01); *F05D 2230/22* (2013.01); *F05D 2230/90* (2013.01); *F05D 2240/11* (2013.01); *F05D 2240/12* (2013.01); *F05D 2240/30* (2013.01); *F05D 2240/35* (2013.01); *F05D 2300/15* (2013.01); *F05D 2300/2112* (2013.01); *F05D 2300/22* (2013.01); *F05D 2300/222* (2013.01); *F05D 2300/6033* (2013.01); *F05D 2300/611* (2013.01)

(58) Field of Classification Search
  CPC . F01D 5/288; F05D 2230/90; F05D 2230/611
  See application file for complete search history.

(56) References Cited

U.S. PATENT DOCUMENTS

| | | |
|---|---|---|
| 4,094,673 A | 6/1978 | Erickson et al. |
| 4,386,968 A | 6/1983 | Hinkel et al. |
| 4,588,607 A | 5/1986 | Matarese et al. |
| 4,663,250 A | 5/1987 | Ong et al. |
| 4,914,794 A | 4/1990 | Strangman |
| 4,996,117 A | 2/1991 | Chu et al. |
| 5,320,909 A | 6/1994 | Scharman et al. |
| 5,350,599 A | 9/1994 | Rigney et al. |
| 5,391,404 A | 2/1995 | Lee et al. |
| 5,496,644 A | 3/1996 | Lee et al. |
| 5,660,885 A | 8/1997 | Hasz et al. |
| 5,714,202 A | 2/1998 | Lemelson et al. |
| 5,704,759 A | 6/1998 | Draskovich et al. |
| 5,773,141 A | 6/1998 | Hasz et al. |
| 5,851,678 A | 12/1998 | Hasz et al. |
| 5,869,146 A | 2/1999 | McCluskey et al. |
| 5,871,820 A | 2/1999 | Hasz et al. |
| 5,876,850 A | 3/1999 | Skowronski et al. |
| 5,876,860 A | 3/1999 | Marijnissen et al. |
| 5,914,189 A | 6/1999 | Hasz et al. |
| 5,985,470 A | 11/1999 | Spitsberg et al. |
| 6,057,047 A | 5/2000 | Maloney |
| 6,261,643 B1 | 7/2001 | Hasz et al. |
| 6,284,325 B1 | 9/2001 | Eaton, Jr. et al. |
| 6,296,942 B1 | 10/2001 | Eaton, Jr. et al. |
| 6,299,988 B1 | 10/2001 | Wang et al. |
| 6,312,763 B1 | 11/2001 | Eaton, Jr. et al. |
| 6,410,148 B1 | 6/2002 | Eaton, Jr. et al. |
| 6,465,090 B1 | 10/2002 | Stowell et al. |
| 6,468,648 B1 | 10/2002 | McCluskey et al. |
| 6,485,848 B1 | 11/2002 | Wang et al. |
| 6,562,409 B2 | 5/2003 | Koshkarian et al. |
| 6,613,445 B2 | 9/2003 | Sangeeta et al. |
| 6,617,036 B2 | 9/2003 | Eaton et al. |
| 6,627,323 B2 | 9/2003 | Nagaraj et al. |
| 6,720,038 B2 | 4/2004 | Darolia et al. |
| 6,723,674 B2 | 4/2004 | Wang et al. |
| 6,733,908 B1 | 5/2004 | Lee et al. |
| 6,759,151 B1 | 7/2004 | Lee |
| 6,787,195 B2 | 9/2004 | Wang et al. |
| 6,812,176 B1 | 11/2004 | Zhu et al. |
| 6,835,465 B2 | 12/2004 | Allen et al. |
| 6,869,508 B2 | 3/2005 | Darolia et al. |
| 6,887,528 B2 | 5/2005 | Lau et al. |
| 6,887,595 B1 | 5/2005 | Darolia et al. |
| 6,890,668 B2 | 5/2005 | Bruce et al. |
| 6,893,750 B2 | 5/2005 | Nagaraj et al. |
| 6,902,662 B2 | 6/2005 | Eaton et al. |
| 6,902,836 B2 | 6/2005 | Eaton et al. |
| 6,933,061 B2 | 8/2005 | Nagaraj et al. |
| 6,933,066 B2 | 8/2005 | Nagaraj et al. |
| 6,969,555 B2 | 11/2005 | Meschter et al. |
| 7,008,674 B2 | 3/2006 | Nagaraj et al. |
| 7,063,894 B2 | 6/2006 | Sun et al. |
| 7,090,894 B2 | 8/2006 | Carper et al. |
| 7,186,466 B2 | 3/2007 | Zhu et al. |
| 7,226,668 B2 | 6/2007 | Nagaraj et al. |
| 7,354,651 B2 | 4/2008 | Hazel et al. |
| 7,374,818 B2 | 5/2008 | Bhatia et al. |
| 7,374,825 B2 | 5/2008 | Hazel et al. |
| 7,442,444 B2 | 10/2008 | Hazel et al. |
| 7,449,254 B2 | 11/2008 | Spitsberg et al. |
| 7,544,394 B2 | 6/2009 | Boutwell et al. |
| 7,579,085 B2 | 8/2009 | Hazel |
| 7,595,114 B2 | 9/2009 | Meschter et al. |
| 7,666,512 B2 | 2/2010 | Bhatia et al. |
| 7,695,830 B2 | 4/2010 | Strangman et al. |
| 7,740,960 B1 | 6/2010 | Zhu et al. |
| 7,867,575 B2 | 1/2011 | Boutwell et al. |
| 7,879,411 B2 | 2/2011 | Hass et al. |
| 7,951,459 B2 | 5/2011 | Tang et al. |
| 7,968,217 B2 | 6/2011 | Sarrafi-Nour et al. |
| 8,084,086 B2 | 12/2011 | Hass et al. |
| 8,119,247 B2 | 2/2012 | Kirby et al. |
| 8,124,252 B2 | 2/2012 | Cybulsky et al. |
| 8,470,460 B2 | 6/2013 | Lee |
| 9,890,089 B2 | 2/2018 | Kirby et al. |
| 2001/0033630 A1 | 10/2001 | Hassoun et al. |
| 2002/0098391 A1* | 7/2002 | Tanaka ................ C04B 41/5024 428/697 |
| 2003/0113553 A1 | 6/2003 | Sun et al. |
| 2003/0113559 A1 | 6/2003 | Eaton et al. |
| 2003/0118841 A1 | 6/2003 | Horne et al. |
| 2003/0138658 A1 | 7/2003 | Taylor et al. |
| 2004/0038085 A1 | 2/2004 | Litton et al. |
| 2004/0043244 A1 | 3/2004 | Bruce et al. |
| 2004/0115351 A1 | 6/2004 | Lau et al. |
| 2004/0151840 A1 | 8/2004 | Wang et al. |
| 2004/0170849 A1 | 9/2004 | Ackerman et al. |
| 2005/0003172 A1 | 1/2005 | Wheeler et al. |
| 2005/0003175 A1 | 1/2005 | Wheeler et al. |
| 2005/0126494 A1 | 6/2005 | Darolia et al. |
| 2005/0129511 A1 | 6/2005 | Allen |
| 2005/0129973 A1 | 6/2005 | Eaton et al. |
| 2005/0164027 A1 | 7/2005 | Lau et al. |
| 2005/0255648 A1 | 11/2005 | Bhatia et al. |
| 2006/0014029 A1 | 1/2006 | Saak et al. |
| 2006/0024513 A1 | 2/2006 | Schlichting et al. |
| 2006/0024527 A1 | 2/2006 | Schlichting et al. |
| 2006/0024528 A1 | 2/2006 | Strangman et al. |
| 2006/0029733 A1 | 2/2006 | Bhatia et al. |
| 2006/0046450 A1 | 3/2006 | Narendar et al. |
| 2006/0073361 A1* | 4/2006 | Fukudome ............ C04B 41/52 428/698 |
| 2006/0078750 A1 | 4/2006 | Zhu et al. |
| 2006/0115659 A1 | 6/2006 | Hazel et al. |
| 2006/0115661 A1 | 6/2006 | Hazel et al. |
| 2006/0154093 A1 | 7/2006 | Meschter et al. |
| 2006/0166018 A1 | 7/2006 | Spitsberg et al. |
| 2006/0210800 A1 | 9/2006 | Spitsberg et al. |
| 2006/0211241 A1 | 9/2006 | Govern et al. |
| 2006/0280952 A1 | 12/2006 | Hazel et al. |
| 2006/0280953 A1 | 12/2006 | Hazel et al. |
| 2006/0280954 A1 | 12/2006 | Spitsberg et al. |
| 2006/0280955 A1 | 12/2006 | Spitsberg et al. |
| 2006/0280963 A1 | 12/2006 | Hazel et al. |
| 2007/0014996 A1 | 1/2007 | Bhatia et al. |
| 2007/0071996 A1 | 3/2007 | Hazel et al. |
| 2007/0082131 A1 | 4/2007 | Doesberg et al. |
| 2007/0119713 A1 | 5/2007 | Hasz |
| 2007/0141367 A1 | 6/2007 | Darolia et al. |
| 2007/0160859 A1 | 7/2007 | Darolia et al. |
| 2007/0184204 A1 | 8/2007 | Balagopal et al. |
| 2007/0207330 A1 | 9/2007 | Tulyani et al. |
| 2007/0224411 A1 | 9/2007 | Hazel et al. |
| 2007/0227299 A1 | 10/2007 | Marchiando et al. |
| 2008/0124479 A1 | 5/2008 | Hazel et al. |

(56) References Cited

U.S. PATENT DOCUMENTS

| | | |
|---|---|---|
| 2008/0145674 A1 | 6/2008 | Darolia et al. |
| 2008/0206542 A1 | 8/2008 | Vance et al. |
| 2008/0274336 A1 | 11/2008 | Merrill et al. |
| 2009/0102008 A1 | 4/2009 | Kakehata |
| 2009/0155554 A1 | 6/2009 | Gentleman et al. |
| 2009/0162556 A1 | 6/2009 | Boutwell et al. |
| 2009/0162684 A1 | 6/2009 | Creech |
| 2009/0169914 A1 | 7/2009 | Fu et al. |
| 2009/0176059 A1 | 7/2009 | Namba et al. |
| 2009/0178413 A1 | 7/2009 | Lee |
| 2009/0184280 A1 | 7/2009 | Lee |
| 2009/0186237 A1 | 7/2009 | Lee |
| 2009/0324930 A1* | 12/2009 | Tulyani .................. C04B 41/52 428/316.6 |
| 2010/0080984 A1 | 4/2010 | Lee |
| 2010/0129636 A1 | 5/2010 | Cybulsky et al. |
| 2010/0136349 A1 | 6/2010 | Lee |
| 2010/0159150 A1 | 6/2010 | Kirby et al. |
| 2010/0159253 A1 | 6/2010 | Kirby et al. |
| 2011/0027467 A1 | 2/2011 | Kirby et al. |
| 2011/0027469 A1 | 2/2011 | Kirby et al. |
| 2011/0027470 A1 | 2/2011 | Kirby et al. |
| 2011/0027476 A1 | 2/2011 | Kirby et al. |
| 2011/0027484 A1 | 2/2011 | Kirby et al. |
| 2011/0027517 A1 | 2/2011 | Kirby et al. |
| 2011/0027557 A1 | 2/2011 | Kirby et al. |
| 2011/0027558 A1 | 2/2011 | Kirby et al. |
| 2011/0027559 A1 | 2/2011 | Kirby et al. |
| 2011/0027578 A1 | 2/2011 | Kirby et al. |
| 2011/0033630 A1 | 2/2011 | Naik et al. |
| 2011/0111310 A1 | 5/2011 | Pastula et al. |
| 2011/0256411 A1 | 10/2011 | Courcot et al. |
| 2012/0076943 A1* | 3/2012 | Kirby .................. C04B 41/52 427/140 |
| 2012/0077004 A1 | 3/2012 | Kirby et al. |
| 2012/0128879 A1 | 5/2012 | Cybulsky et al. |
| 2012/0244383 A1 | 9/2012 | Meschter et al. |
| 2012/0315492 A1* | 12/2012 | Pujari .................. C04B 41/52 428/446 |
| 2013/0136915 A1 | 5/2013 | Naik |
| 2013/0189531 A1 | 7/2013 | Lee |
| 2013/0224457 A1 | 8/2013 | Lee |
| 2014/0065438 A1 | 3/2014 | Lee |
| 2014/0134399 A1* | 5/2014 | Kirby .................. C04B 35/16 428/141 |
| 2014/0255680 A1* | 9/2014 | Lee .................. F01D 5/288 428/312.6 |
| 2015/0267058 A1 | 9/2015 | Lee |
| 2016/0130188 A1* | 5/2016 | Louchet .................. C04B 41/52 428/448 |
| 2016/0311726 A1* | 10/2016 | Kirby .................. C04B 41/009 |
| 2016/0312628 A1* | 10/2016 | Kirby .................. C04B 41/52 |
| 2017/0218779 A1* | 8/2017 | Luthra .................. F01D 5/288 |
| 2017/0247787 A1* | 8/2017 | Saha .................. C04B 41/52 |
| 2018/0320270 A1* | 11/2018 | Nardi .................. C23C 24/04 |
| 2018/0347049 A1* | 12/2018 | Oboodi .................. F01D 5/225 |

FOREIGN PATENT DOCUMENTS

| | | |
|---|---|---|
| EP | 1335040 A2 | 8/2003 |
| EP | 1400611 A1 | 3/2004 |
| EP | 1428902 A1 | 6/2004 |
| EP | 1479661 A2 | 11/2004 |
| EP | 1626039 A2 | 2/2006 |
| EP | 1666638 A1 | 6/2006 |
| EP | 1795515 A2 | 6/2007 |
| EP | 1806435 A2 | 7/2007 |
| EP | 1829847 A2 | 9/2007 |
| EP | 1975258 A1 | 10/2008 |
| EP | 2108715 A2 | 10/2009 |
| EP | 2189504 A1 | 5/2010 |
| EP | 2192098 A2 | 6/2010 |
| EP | 2194164 A1 | 6/2010 |
| EP | 2208805 A1 | 7/2010 |
| EP | 2245096 A2 | 11/2010 |
| EP | 2287131 A2 | 2/2011 |
| EP | 2287134 A2 | 2/2011 |
| EP | 2287138 A2 | 2/2011 |
| GB | 2319248 A | 5/1998 |
| SG | 163216 | 3/2013 |
| WO | 2006023894 A2 | 3/2006 |
| WO | 2007098152 A2 | 8/2007 |
| WO | 2007116547 A2 | 10/2007 |
| WO | 2008103163 A2 | 8/2008 |
| WO | 2008109214 A2 | 9/2008 |
| WO | 2009091721 A2 | 7/2009 |
| WO | 2009091724 A1 | 7/2009 |
| WO | 2010039699 A3 | 4/2010 |
| WO | 2011123432 A1 | 10/2011 |
| WO | 2012012431 A1 | 1/2012 |
| WO | 2012122373 A1 | 9/2012 |
| WO | 2012129431 A1 | 9/2012 |

OTHER PUBLICATIONS

"Coating Technology for the Future," Directed Vapor Technologies International, Inc., retrieved from http://www.directedvapor.com/Capabilities_Brochure.pdf on Dec. 9, 2013, 7 pp.

Lee et al., "Rare earth silicate environmental barrier coatings for SiC/SiC composites and Si3N4 ceramics," Journal of the European Ceramic Society, vol. 25, Jan. 21, 2005, 12 pp.

Shelby et al., "Rare earth aluminosilicate glasses," Journal of American Ceramic Society, vol. 73, No. 1, Jan. 1990, 4 pp.

U.S. Appl. No. 14/193,419, filed Feb. 28, 2014, by Lee et al.

U.S. Appl. No. 14/193,467, filed Feb. 28, 2014, by Lee.

* cited by examiner

MULTILAYER ENVIRONMENTAL BARRIER COATING

This application claims the benefit of U.S. Provisional Application No. 62/563,891, filed Sep. 27, 2017, which is incorporated herein by reference in its entirety.

TECHNICAL FIELD

The disclosure relates to environmental barrier coatings.

BACKGROUND

Ceramic or ceramic matrix composite (CMC) materials may be useful in a variety of contexts where mechanical and thermal properties are important. Ceramic or CMC materials may be resistant to high temperatures, but some ceramic or CMC materials may react with some elements and compounds present in the operating environment of high temperature mechanical systems, such as water vapor. Reaction with water vapor may result in the recession of the ceramic or CMC material. These reactions may damage the ceramic or CMC material and reduce mechanical properties of the ceramic or CMC material, which may reduce the useful lifetime of the component. Thus, in some examples, a ceramic or CMC material may be coated with an environmental barrier coating, which may reduce exposure of the substrate to elements and compounds present in the operating environment of high temperature mechanical systems.

SUMMARY

In some examples, the disclosure describes an article that includes a substrate, a bond coat on the substrate, and a multilayer environmental barrier coating (EBC) on the bond coat. The multilayer EBC includes a first EBC layer defining a first thickness and a second EBC layer defining a second thickness. The first EBC layer includes a first rare earth disilicate and a first concentration of a sintering aid that includes alumina. The second EBC layer includes a second rare earth disilicate and a second concentration of the sintering aid that includes alumina, less than the first concentration of the sintering aid.

In some examples, the disclosure describes a method that includes depositing a bond coat on a substrate and depositing a multilayer environmental barrier coating (EBC) on the bond coat. The multilayer EBC includes a first EBC layer defining a first thickness and a second EBC layer defining a second thickness. The first EBC layer includes a first rare earth disilicate and a first concentration of a sintering aid that includes alumina. The second EBC layer includes a second rare earth disilicate and a second concentration of the sintering aid that includes alumina, less than the first concentration of alumina.

The details of one or more examples are set forth in the accompanying drawings and the description below. Other features, objects, and advantages will be apparent from the description and drawings, and from the claims.

DETAILED DESCRIPTION

Figure 1:
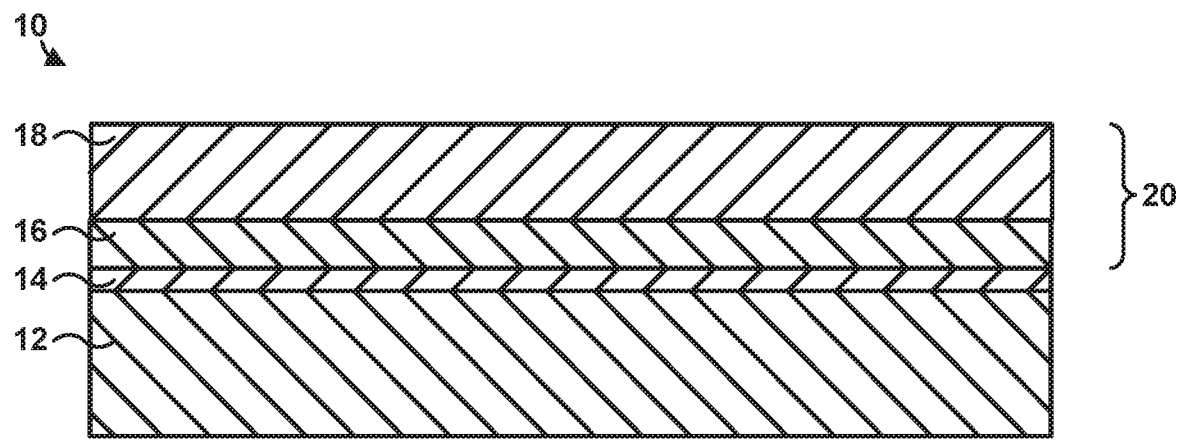
FIG. 1 is a conceptual diagram illustrating a cross-sectional view of an example of an article used in a high-temperature mechanical system.

The disclosure describes multilayer environmental barrier coatings that include at least a first layer and a second layer. The first layer and the second layer may each include a rare earth silicate and a sintering aid that includes alumina. A concentration of the sintering aid in the second layer may be less than a concentration of the sintering aid in the first layer. For example, the concentration of the sintering aid in the first layer may be between about 2 wt. % and about 10 wt. % and the concentration of the sintering aid in the second layer may be greater than 0 wt. % and less than about 1 wt. %.

An environmental barrier coating (EBC) may be adhered to a substrate by a bond coat. The bond coat may act as an adhesive for the EBC and a passive barrier layer for oxidative species, such as oxygen, water vapor, or the like. The EBC may provide oxidation and water vapor resistance to both the bond coat and the substrate. However, the EBC may have microstructural characteristics, such as pores, cracks, grains, and the like, that allow migration of oxidative species and lower the oxidation resistance of the EBC. For example, an EBC may have pores formed during deposition or component operation that allow oxidative species to contact the bond coat and form a thermally grown oxide (TGO) layer. However, thinner TGO thickness is generally desirable and may improve the life of the coating.

In some examples, the oxidation resistance of the EBC may be improved by increasing the density and/or thickness of the EBC to reduce the diffusion and migration of the oxidative species through the EBC. For example, an EBC having a higher density at a particular thickness may increase the oxidation resistance of the EBC; likewise, an EBC having a greater thickness at a particular density may increase the oxidation resistance of the EBC. However, as density and/or thickness of the EBC increases, the compliance of the EBC decreases, which may increase the likelihood of the EBC to develop through-thickness cracks or delaminate from the bond coat.

According to principles of the disclosure, a multilayer EBC may have improved oxidation resistance with a reduced likelihood of developing through-thickness cracks. At least two EBC layers of the multilayer EBC may include a sintering aid that includes alumina. In some examples, the sintering aid may optionally include an alkaline earth oxide; a transition metal oxide, such as copper oxide (CuO); and other metal oxides. The sintering aid may reduce a sintering temperature of the respective EBC layer. As the sintering temperature of each respective EBC layer decreases, the respective EBC layer may become denser, such that an EBC layer with a higher concentration of the sintering aid has a corresponding denser structure.

EBC layers of the multilayer EBC may be configured so that denser EBC layers having higher concentrations of the sintering aid may be relatively thin to mitigate formation of microcracks in the denser EBC layer, while less dense EBC layer having lower concentrations of the sintering aid may be relatively thicker. For example, a first of the at least two EBC layers may have a relatively higher concentration of the sintering aid that includes alumina—corresponding to a higher density—than a second of the at least two EBC layers, and may provide the multilayer EBC with increased oxidation resistance. The second of the at least two EBC layers may have a relatively lower concentration of the sintering aid that includes alumina—corresponding to a lower density—than the first of the at least two EBC layers, and may provide the multilayer EBC with oxidation resistance and a lower likelihood of formation of through-thickness crack formation than a denser EBC layer. By providing at least two EBC layers—one higher density EBC layer directed to providing a higher level of oxidation resistance and the other lower density EBC layer directed to providing additional oxidation resistance—the multilayer EBC may have higher oxidation resistance than a single layer EBC at the lower density and higher through-thickness crack resistance than a single layer EBC at the higher density and/or greater thickness.

FIG. 1 shows a cross-sectional view of an example of an article 10 used in a high-temperature mechanical system. The article 10 includes a substrate 12, a bond coat 14 on substrate 12, and a multilayer environmental barrier coating (EBC) 20 on bond coat 14. Multilayer EBC 20 includes a first EBC layer 16 on bond coat 14 and a second EBC layer 18 on first EBC layer 16. Multilayer environmental barrier coating 20 may be deposited by any one or more suitable coating fabrication technique, including, for example, thermal spraying; a vapor phase deposition technique such as, physical vapor deposition (PVD), electron beam PVD (EB-PVD, directed vapor deposition (DVD), or chemical vapor deposition (CVD); a slurry process; or the like.

Article 10 may be a component of a high-temperature mechanical system. For example, article 10 may be a blade track, a blade shroud, an airfoil, a blade, a vane, a combustion chamber liner, or the like, of a gas turbine engine.

In some examples, substrate 12 includes a superalloy, while in other examples, substrate 12 includes a ceramic or ceramic matrix composite (CMC). In examples in which substrate 12 includes a superalloy, substrate 12 may include an alloy based on Ni, Co, Ni/Fe, Ti, or the like. Substrate 12 may include other additive elements to alter mechanical properties of substrate 12, such as toughness, hardness, temperature stability, corrosion resistance, oxidation resistance, and the like, as is well known in the art. Any useful superalloy may be utilized in substrate 12, including, for example, those available from Martin-Marietta Corp., Bethesda, Md., under the trade designation MAR-M247; those available from Cannon-Muskegon Corp., Muskegon, Mich., under the trade designations CMSX-4 and CMSX-10; and the like.

In some examples in which substrate 12 includes a ceramic, the ceramic may be substantially homogeneous. In some examples, a substrate 12 that includes a ceramic includes, for example, a silicon-containing ceramic, such as silica ($SiO_2$), silicon carbide (SiC) or silicon nitride ($Si_3N_4$); alumina ($Al_2O_3$); aluminosilicate; or the like. In other examples, substrate 12 includes a metal alloy that includes silicon, such as a molybdenum-silicon alloy (e.g., $MoSi_2$) or a niobium-silicon alloy (e.g., $NbSi_2$).

In examples in which substrate 12 includes a CMC, substrate 12 includes a matrix material and a reinforcement material. The matrix material includes a ceramic material, such as, for example, silicon carbide, silicon nitride, alumina, aluminosilicate, silica, or the like. The CMC further includes a continuous or discontinuous reinforcement material. For example, the reinforcement material may include discontinuous whiskers, platelets, or particulates. As other examples, the reinforcement material may include a continuous monofilament or multifilament weave. In some examples, the composition of the reinforcement material is the same as the composition of the matrix material. For example, a matrix material comprising silicon carbide may surround a reinforcement material comprising silicon carbide whiskers. In other examples, the reinforcement material includes a different composition than the composition of the matrix material, such as aluminosilicate fibers in an alumina matrix, or the like. One composition of a substrate 12 that includes a CMC includes a reinforcement material comprising silicon carbide continuous fibers embedded in a matrix material comprising silicon carbide. In some examples, substrate 12 may include a SiC—SiC CMC, in which a fibrous preform including SiC fibers is impregnated with SiC particles from a slurry, then melt infiltrated with silicon metal or a silicon alloy to form the melt-infiltrated SiC—SiC CMC.

As shown in FIG. 1, article 10 includes bond coat 14 on substrate 12. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, i.e., there are no intermediate layers or coatings. In other examples, article 10 may omit bond coat 14, and multilayer EBC 20 may be directly on substrate 12.

Bond coat 14 may improve adhesion between substrate 12 and the layer on bond coat 14 (e.g., first EBC layer 16 in FIG. 1), and also may act as a protective layer that decreases migration of an oxidizing agent into substrate 12 by reacting with an oxidizing species to form a protective thermally grown oxide (TGO) layer. Bond coat 14 may include any useful material that improves adhesion between substrate 12 and an overlying layer. For example, in examples in which substrate 12 is a superalloy, bond coat 14 may include an alloy, such as an MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-$Ni_3Al$ nickel aluminide alloy (either unmodified or modified by Pt, Cr, Hf, Zr, Y, Si, and combination thereof), or the like.

In examples in which substrate 12 is a ceramic or CMC, bond coat 14 may a silicon-based bond coat, and may include silicon metal (e.g., elemental silicon; Si), a silicon-containing alloy, a silicon-containing ceramic, or another silicon-containing compound. In some examples, the presence of Si in bond coat 14 may promote adherence between bond coat 14 and substrate 12 and between bond coat 14 and multilayer EBC 20, such as, for example, when substrate 12, multilayer EBC 20, or both, includes silicon metal or a silicon-containing alloy or compound.

A bond coat 14 that is silicon-based may optionally include at least one additive. The optional at least one additive may include, for example, at least one of SiC, an oxidation enhancer, a transition metal carbide, a transition metal boride, or a transition metal nitride. SiC may affect the properties of bond coat 14. For example, SiC particles may modify oxidation resistance of bond coat 14, modify chemical resistance of bond coat 14, influence the CTE of bond coat 14, or the like. In some examples, bond coat 14 may include between about 1 vol. % and about 40 vol. % SiC, such as between about 1 vol. % and about 20 vol. % SiC, or between about 5 vol. % and about 40 vol. % SiC, or between about 5 vol. % and about 20 vol. % SiC.

In examples in which bond coat 14 includes an oxidation enhancer, the oxidation enhancer may include at least one of molybdenum, hafnium, or ytterbium. In some examples in which bond coat 14 includes an oxidation enhancer, bond coat 14 may include greater than 0 wt. % and less than about 10 wt. % of the oxidation enhancer. The oxidation enhancer may facilitate formation of a stable oxide scale on a surface of bond coat 14, which may increase adhesion between bond coat 14 and multilayer EBC 20, reduce diffusion of elements through bond coat 14, or both.

Bond coat 14 additionally or alternatively may include at least one of a transition metal carbide, a transition metal boride, or a transition metal nitride. The transition metal may include, for example, Cr, Mo, Nb, W, Ti, Ta, Hf, or Zr. The at least one transition metal carbide may include at least one of $Cr_3C_2$, $Cr_7C_3$, $Cr_{23}C_6$, $Mo_2C$, NbC, WC, TaC, HfC, or ZrC. The at least one transition metal boride may include at least one of TaB, $TaB_2$, $TiB_2$, $ZrB_2$, HfB, or $HfB_2$. The at least one transition metal nitride may include at least one of TiN, ZrN, HfN, $Mo_2N$, or TaN. In some examples, bond coat 14 may include between about 40 volume percent (vol. %) and about 99 vol. % silicon and a balance of the at least one of a transition metal carbide, a transition metal nitride, or a transition metal boride. In some examples, bond coat 14 may include between about 1 vol. % and about 30 vol. %, or between about 5 vol. % and about 20 vol. % of the at least one of a transition metal carbide, a transition metal boride, or a transition metal nitride, and a balance silicon metal and any additional constituents. The particular composition ranges may vary based on the CTE of the at least one of a transition metal carbide, a transition metal boride, or a transition metal nitride. Transition metal carbides, transition metal borides, and transition metal nitrides may have a different CTE than silicon metal. By mixing silicon and a transition metal carbide, a transition metal boride, or transition metal nitride, the CTE of bond coat 14 may be increased to more closely match the CTE of substrate 12, the CTE of multilayer EBC 20, or any combination thereof. This may reduce stress at the interfaces between bond coat 14 and adjacent layers during thermal cycling of article 10. Additionally, or alternatively, the addition of the at least one of the transition metal carbide, the transition metal boride, or the transition metal nitride may improve oxidation resistance of bond coat 14 compared to a bond layer including only silicon.

The composition of bond coat 14 may be selected based on a number of considerations, including the chemical composition and phase constitution of substrate 12 and the layer on bond coat 14 (in FIG. 1, first EBC layer 16). For example, when substrate 12 includes a superalloy with a γ-Ni+γ'-Ni₃Al phase constitution, bond coat 14 preferably includes a γ-Ni+γ'-Ni₃Al phase constitution to better match the coefficient of thermal expansion of the superalloy substrate 12. This may increase the mechanical stability (adhesion) of the coating 14 to the substrate 12. Alternatively, when substrate 12 includes a CMC, bond coat 14 may include silicon metal or a ceramic, for example, mullite.

As mentioned above, bond coat 14 may act as a protective layer that decreases migration of an oxidizing agent into substrate 12. Bond coat 14 may form a protective thermally grown oxide (TGO) layer with the oxidizing species. However, it is generally desirable to keep TGO thinner for improved coating life.

Article 10 further includes multilayer EBC 20 on bond coat 14. Multilayer EBC 20 includes at least two EBC layers. In the example illustrated in FIG. 1, multilayer EBC 20 includes a first EBC layer 16 and a second EBC layer 18 on first EBC layer 16; however, in other examples, multilayer EBC 20 may include more than two EBC layers.

Multilayer EBC 20 may include at least two EBC layers that each include a rare earth disilicate ($RE_2Si_2O_7$, where RE stands for "rare earth"). In the example of FIG. 1, first EBC layer 16 and second EBC layer 18 each include a rare earth disilicate. The rare earth disilicate may reduce or substantially prevent attack of substrate 12 and/or bond coat 14 by chemical species present in the environment in which article 10 is utilized, e.g., in the intake gas or exhaust gas of a gas turbine engine. Rare earth elements that may be used in the rare earth disilicates include, but are not limited to, La, Pr, Nd, Pm, Sm, Eu, Gd, Tb, Dy, Ho, Er, Tm, Yb, Lu, Y, Sc, and the like. In some examples, the rare earth disilicate may have a coefficient of thermal expansion (CTE) that is close to substrate 12 and/or bond coat 14. For example, in examples where first EBC layer 16 includes ytterbium disilicate ($Yb_2Si_2O_7$), bond coat 14 includes silicon (Si) metal, and substrate 12 includes silicon carbide (SiC), ytterbium disilicate may have a CTE of about $4.7 \times 10^{-6 \circ} C.^{-1}$, while silicon and silicon carbide may each have a CTE of about $4.5 \times 10^{-6 \circ} C.^{-1}$.

In some examples, the EBC layers may additionally include free silica (e.g., silica that has not reacted with rare earth oxide to form rare earth disilicate), free rare earth oxide (e.g., rare earth oxide that has not reacted with silica to form rare earth disilicate), rare earth monosilicate (RE-$SiO_5$, where RE stands for "rare earth"), or combinations thereof. In some examples, the EBC layers may be substantially free (e.g., free or nearly free) of hafnia and/or zirconia. Zirconia and hafnia may be susceptible to chemical attack by CMAS, so an EBC layer substantially free of hafnia and/or zirconia may be more resistant to CMAS attack than an EBC layer that includes zirconia and/or hafnia.

First EBC layer 16 and second EBC layer 18 also each include a sintering aid. The sintering aid includes alumina ($Al_2O_3$). The sintering aid may lower a sintering temperature of each of first EBC layer 16 and second EBC layer 18 as compared to EBC layers with lower concentrations of alumina (or no alumina). The reduction in sintering temperature may result in greater densification of first EBC layer 16 and second EBC layer 18 during formation, and, correspondingly, an increase in oxidation resistance provided to underlying layers, such as substrate 12 and bond coat 14, which will be explained further below. During operation of the component, the sintering aid may continue to promote sintering at high temperatures. In some examples, the sintering aid in one or both of first EBC layer 16 and second EBC layer 18 may optionally include an alkaline earth oxide in addition to alumina ($Al_2O_3$). Alkaline earth oxides include beryllium oxide (BeO), magnesium oxide (MgO), calcium oxide (CaO), strontium oxide (SrO), barium oxide (BaO), and radium oxide (RaO).

Multilayer EBC 20 includes at least two EBC layers having differing concentrations of sintering aids that include alumina and, optionally, an alkaline earth oxide. In the example of FIG. 1, first EBC layer 16 may include a first concentration of the sintering aid and second EBC layer 18 may have a second concentration of the sintering aid, which is less than the first concentration of alumina of first EBC layer 16. A concentration of the sintering aid for a particular EBC layer may correspond to a density of the EBC layer, such that an increased concentration of alumina corresponds to an increased density of the EBC layer. As such, first EBC layer 16 may have a higher density, corresponding to the higher concentration of the sintering aid, than second EBC layer 18, corresponding to the lower concentration of the sintering aid. In some examples, first EBC layer 14 may include a concentration of greater than or equal to about 2 wt. % and less than or equal to about 10 wt. % of the sintering aid, and second EBC layer 18 may include a concentration of greater than 0 wt. % and less than about 1 wt. % the sintering aid.

As the density of an EBC layer increases, porosity may decrease and/or incidence or size of cracks created during formation of the EBC layer may decrease, which may increase the oxidation resistance of the EBC layer, e.g., due to a reduction in migration rate of oxidizing species through the EBC layer. For example, the sintering aid may reduce a temperature at which sintering occurs. During sintering, a structure of the EBC layer may become more compact, which may reduce porosity, cracks, and other voids that may form during deposition of the EBC layer and/or through operation of the component.

However, while an increase in the density of the EBC layer may increase the oxidation resistance of the EBC layer, the increase in density may also increase a likelihood of forming through-thickness cracks in the EBC layer after formation of the EBC layer, such as during operation of article 10. For example, as a thickness of the EBC layer on article 10 increases, the compliance of the EBC layer may decrease, and effects of mismatches in thermal expansion coefficients with adjacent layers may increase, such that the EBC layer is more likely to crack or delaminate during operation of the article. Through-thickness cracks may allow oxidation species to diffuse through the EBC layer, thus lowering the oxidation resistance of the EBC layer.

In some examples, multilayer EBC 20 may include at least two EBC layers having different thicknesses. In the example of FIG. 1, a first thickness of first EBC layer 16 may be different than a second thickness of second EBC layer 18. In some examples, the first thickness of first EBC layer 16 may be selected to be less than a threshold thickness associated with a particular concentration of the sintering temperature reduction agent in first EBC layer 16. For example, a threshold thickness of an EBC layer at a concentration of 5 wt. % of alumina may be about 50 μm, such that a thickness of first EBC layer 16 is less than or equal to about 50 μm when first EBC layer 16 includes 5 wt. % alumina. Second EBC layer 18 may include a concentration of the sintering temperature reduction agent and a thickness that corresponds to a remaining desired oxidation resistance. For example, the concentration and thickness of first EBC layer 16, while providing increased oxidation resistance, may not provide the desired oxidation resistance of multilayer EBC 20 while having a thickness below the threshold thickness for the particular concentration of the sintering temperature reduction agent. Second EBC layer 18 may provide a remaining oxidation resistance. In some examples, first EBC layer 16 may have a thickness of less than 50 μm. In some examples, second EBC layer 18 may have a thickness of greater than about 25 μm and less than or equal to about 250 μm.

In some examples, the first thickness of first EBC layer 16 may be less than the second thickness of second EBC layer 18, such that the EBC layer with a higher concentration of the sintering temperature reduction agent (in this instance, first EBC layer 16) has a lower thickness than the EBC layer with a lower concentration of the sintering temperature reduction agent (in this instance, second EBC layer 18). For example, in the example above, the second EBC layer may have a concentration of about 1 wt. % of the sintering temperature reduction agent and a thickness greater than 50 μm.

In some examples, multilayer EBC 20 may include the first concentration and first thickness of first EBC layer 16 and the second concentration and second thickness of second EBC layer 18 so that multilayer EBC 20 has an increased overall oxidation resistance. For example, the first concentration and first thickness of first EBC layer 16 may be balanced with the second concentration and second thickness of second EBC layer 18 to provide an increased oxidation resistance for multilayer EBC 20 while reducing an overall incidence of formation of cracks that extend through the entire multilayer EBC 20.

By including a multilayer EBC having two or more EBC layers that include the sintering temperature reduction agent in different concentrations, an article may increase oxidation resistance as compared to an article that includes lower density EBC layers (e.g., EBC layers that do not include the sintering temperature reduction agent). For example, oxygen diffusion through an EBC layer may be reduced due to a reduction in porosity, crack incidence, or the like. By including a multilayer EBC 20 that include a first EBC layer that has a higher concentration of the sintering temperature reduction agent, and thus higher density, than a second EBC layer that has a lower concentration of the sintering temperature reduction agent, and thus lower likelihood of through-thickness cracks, an article may have a desired environmental protection with a reduced likelihood of through-thickness cracks that span the entire multilayer EBC 20.

Figure 2:
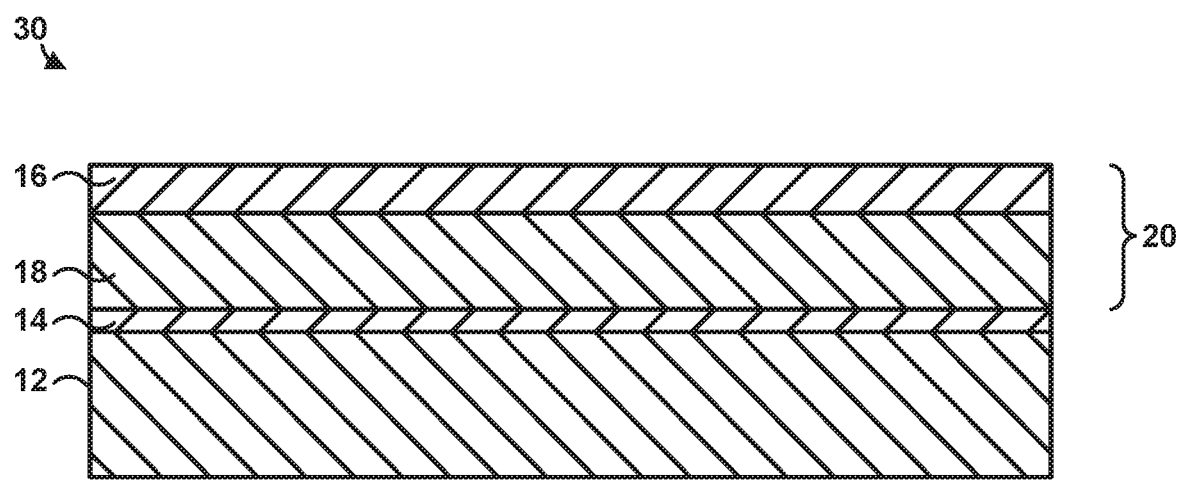
FIG. 2 is a conceptual diagram illustrating a cross-sectional view of an example of an article used in a high-temperature mechanical system.

An arrangement of the EBC layer having a higher sintering aid concentration and the EBC layer having a lower sintering aid concentration within the multilayer EBC may be selected for factors that affect the coating performance of the multilayer EBC, such as water vapor recession or CMAS resistance; the adhesion of the multilayer EBC, such as CTE mismatch; the TGO interface, such as TGO chemistry or crystallization kinetics; and the like. In the example of FIG. 1, the EBC layer having a higher sintering aid concentration of multilayer EBC 20 is on bond coat 14, while the EBC layer having a lower sintering aid concentration of multilayer EBC 20 is on the EBC layer having a higher sintering aid concentration. However, in other examples, the EBC layer having a higher sintering aid concentration of multilayer EBC 20 may be on the EBC layer having a lower sintering aid concentration of multilayer EBC 20. For example, an EBC layer having a lower sintering aid concentration of multilayer EBC 20 may have a CTE that more closely matches bond coat 14 than an EBC layer having a higher sintering aid concentration of multilayer EBC 20. As another example, an EBC layer having a higher sintering aid concentration that includes alumina may have a higher CMAS resistance, such that the EBC layer having the higher sintering aid concentration may be on a surface of the EBC. As another example, an EBC layer having a higher sintering aid concentration may be denser and thus more resistant to water vapor recession, such that the EBC layer having the higher sintering aid concentration may be on a surface of the EBC. FIG. 2 shows a cross-sectional view of an example of an article 30 used in a high-temperature mechanical system. The components of article 30 of FIG. 2 may correspond to the components of article 10 of FIG. 1 having similar labels.

In the example of FIG. 2, first EBC layer 16—having a higher concentration of multilayer EBC 20—is on second EBC layer 18—having a lower concentration of multilayer EBC 20.

Figure 3:
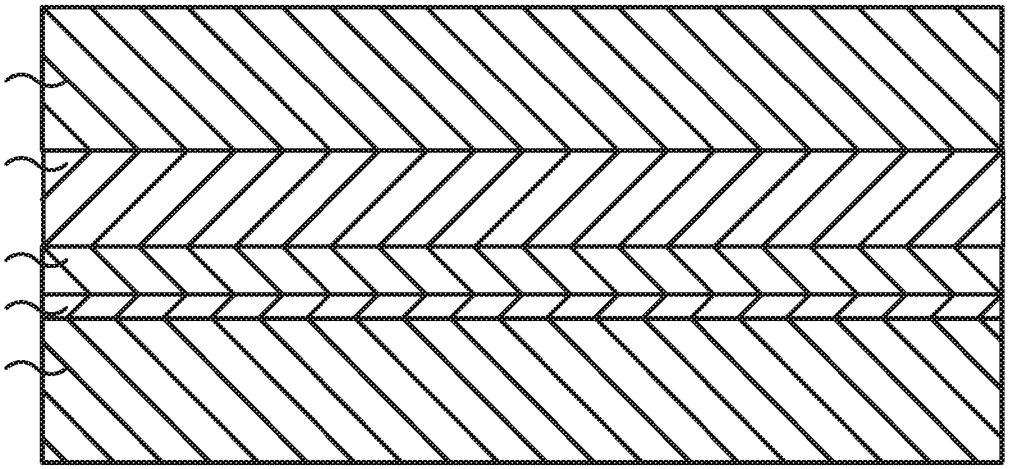
FIG. 3 is a conceptual diagram illustrating a cross-sectional view of an example of an article used in a high-temperature mechanical system that includes an additional coating.

In some examples, a coating system may include additional layers on a multilayer EBC. FIG. 3 shows a cross-sectional view of an example of an article 50 used in a high-temperature mechanical system that includes an additional coating 52. Article 50 includes substrate 12, bond coat 14 on substrate 12, a multilayer EBC 50 on bond coat 14, and additional coating 52 on multilayer EBC 50. Multilayer EBC 50 includes a first EBC layer 56 and a second EBC layer 58, which may correspond to first EBC layer 16 and second EBC layer 18 of FIGS. 1 and 2.

Additional coating 52 may provide one or more function to multilayer EBC 50. For example, additional coating 52 may include a thermal barrier coating (TBC), a CMAS-resistant coating, an abradable coating, an erosion resistance coating, or the like.

A TBC may have a low thermal conductivity (e.g., both an intrinsic thermal conductivity of the material(s) that forms the TBC and an effective thermal conductivity of the TBC as constructed) to provide thermal insulation to substrate 12, bond coat 14, and/or multilayer EBC 50. In some examples, a TBC may include a zirconia- or hafnia-based material, which may be stabilized or partially stabilized with one or more oxides. In some examples, the inclusion of rare-earth oxides such as ytterbia, samaria, lutetia, scandia, ceria, gadolinia, neodymia, europia, yttria-stabilized zirconia (YSZ), zirconia stabilized by a single or multiple rare-earth oxides, hafnia stabilized by a single or multiple rare-earth oxides, zirconia-rare-earth oxide compounds, such as $RE_2Zr_2O_7$ (where RE is a rare-earth element), hafnia-rare-earth oxide compounds, such as $RE_2Hf_2O_7$ (where RE is a rare-earth element), and the like may help decrease the thermal conductivity (by conduction) of the TBC. In some examples, a TBC may include a base oxide including zirconia or hafnia, a first rare earth oxide including ytterbia, a second rare earth oxide including samaria, and a third rare earth oxide including at least one of lutetia, scandia, ceria, neodymia, europia, or gadolinia. A TBC may include porosity, such as a columnar or microporous microstructure, which may contribute to relatively low thermal conductivity of the TBC.

A CMAS-resistant coating may include an element or compound that reacts with CMAS to form a solid or a highly-viscous reaction product (i.e., a reaction product that is a solid or highly viscous at the temperatures experienced by article 40), or reduces a reaction rate of the CMAS-resistant coating with CMAS or a migration rate of CMAS into the CMAS-resistant coating. In some examples, the CMAS-resistant coating includes $Al_2O_3$ and at least one rare-earth oxide, such as, for example, an oxide of at least one of Sc, Y, La, Ce, Pr, Nd, Pm, Sm, Eu, Gd, Tb, Dy, Ho, Er, Tm, Yb, Lu, or combinations thereof. The combination of $Al_2O_3$ and at least one rare-earth oxide may allow tailoring of one or more properties of the CMAS-resistant coating, such as, for example, the chemical reactivity of the CMAS-resistant coating with CMAS, the viscosity of the reaction products, the CTE of the CMAS-resistant coating, the chemical compatibility of the CMAS-resistant coating with bond coat 20 and/or composite coating layer 14, or the like.

In some examples, the CMAS-resistant coating is essentially free of $ZrO_2$ and/or $HfO_2$. That is, in these examples, the CMAS-resistant coating includes at most trace amounts of $ZrO_2$ and/or $HfO_2$, such as, for example, the amounts present in commercially-available rare-earth oxides.

In some examples, the CMAS-resistant coating may include $SiO_2$ in addition to the $Al_2O_3$ and at least one rare-earth oxide to form one or more discrete phase regions of the $SiO_2$, $Al_2O_3$, and rare-earth oxide. $SiO_2$ can be added to the CMAS-resistant coating to allow further manipulation of the properties of the CMAS-resistant coating, such as, for example, the chemical reactivity, viscosity of the reaction products, the CTE, the chemical compatibility of the CMAS-resistant coating with bond coat 14 and/or multilayer EBC 50, or the like.

In some examples, the CMAS-resistant coating optionally includes other additive components, such as, for example, $TiO_2$, $Ta_2O_5$, $HfSiO_4$, alkali metal oxides, alkali earth metal oxides, or mixtures thereof. The additive components may be added to the CMAS-resistant coating to modify one or more desired properties of the CMAS-resistant coating. For example, the additive components may increase or decrease the reaction rate of the CMAS-resistant coating with CMAS, may modify the viscosity of the reaction product from the reaction of CMAS and the CMAS-resistant coating, may increase adhesion of the CMAS-resistant coating to multilayer EBC 50, may increase or decrease the chemical stability of the CMAS-resistant coating, or the like.

In some examples, the CMAS-resistant coating may include up to about 99 mol. % of the at least one rare-earth oxide, ±1 mol. %, and up to about 90 mol. % of $Al_2O_3$, with a total of 100 mol. %. In some examples, the CMAS-resistant coating may also include up to about 90 mol. % of $SiO_2$. In other examples, the CMAS-resistant coating may additionally include up to about 50 mol. % of at least one of $TiO_2$, $Ta_2O_5$, $HfSiO_4$, an alkali oxide, or an alkali earth oxide.

In some examples, additional coating 52 may include an abradable coating. The abradable coating may be selected to protect multilayer EBC 50 from physical damage, such as impact against other components. An abradable coating may be configured to be abraded, e.g., by a blade of a gas turbine engine, in order to form a relatively tight seal between article 40 and another component, such as, for example, a blade of a gas turbine engine. Abradability may include a disposition to break into relatively small pieces when exposed to a sufficient physical force. Abradability may be influenced by the material characteristics of the material(s) in the abradable coating, such as fracture toughness and fracture mechanism (e.g., brittle fracture), as well as the porosity of the abradable coating. In examples in which additional coating 52 includes an abradable costing, additional coating 52 may exhibit thermal shock resistance and high-temperature capability.

The abradable coating may include any suitable material. For example, the abradable coating may include at least one of a rare-earth oxide, a rare-earth silicate, an aluminosilicate, or an alkaline earth aluminosilicate. In some examples, as described above, additional coating 52 including an abradable coating includes at least one rare-earth disilicate, mullite, BSAS, BAS, SAS, at least one rare earth oxide, at least one rare earth monosilicate, or combinations thereof. Additionally, or alternatively, additional coating 52 including an abradable coating may include any of the compositions described herein with respect to the EBC.

Figure 4:
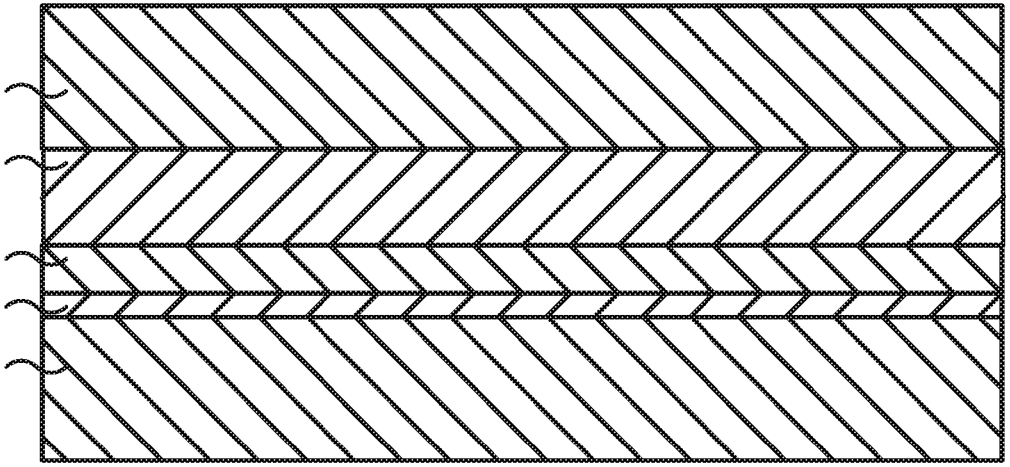
FIG. 4 is a conceptual diagram illustrating a cross-sectional view of an example of an article used in a high-temperature mechanical system that includes a multilayer EBC that includes more than two EBC layers.

In some examples, the multilayer EBC may include more than two EBC layers. For example, a desired oxidation resistance of the multilayer EBC may not be achieved with two EBC layers without exceeding a maximum thickness of each of the two EBC layers, such that a third EBC layer is desired. As another example, a third EBC layer may provide an intermediate level of oxidation resistance between a thinner, denser first EBC layer and a thicker, less dense second EBC layer, as well as buffer for CTE mismatch between the first EBC layer and the second EBC layer. FIG. 4 shows a cross-sectional view of an example of an article 60 used in a high-temperature mechanical system that includes a multilayer EBC 70 that includes more than two EBC layers. Article 60 includes substrate 12, bond coat 14, and multilayer EBC 70. Multilayer EBC 70 includes a first EBC layer 76, a second EBC layer 78, and a third EBC layer 80.

First EBC layer 76, second EBC layer 78, and third EBC layer 80 may include any combination of thicknesses and concentrations of the sintering temperature reduction agent that includes alumina and, optionally, alkaline earth oxides, as described herein. In some examples, multilayer EBC 70 may include graded EBC layers that decrease in concentration of the sintering temperature reduction agent with increasing distance from bond coat 14. For example, first EBC layer 76 may include a thickness of greater than about 10 μm and less than about 50 μm at a concentration of greater than about 3 wt. % and less than about 5 wt. % of the sintering temperature reduction agent; second EBC layer 78 may include a thickness greater than about 10 μm and less than about 100 μm at a concentration of greater than about 1 wt. % and less than about 3 wt. % of the sintering temperature reduction agent; and third EBC layer 80 may include a thickness greater than about 10 μm and less than about 150 μm at a concentration greater than about 0 wt. % and less than about 1 wt. % of the sintering temperature reduction agent.

Figure 5:
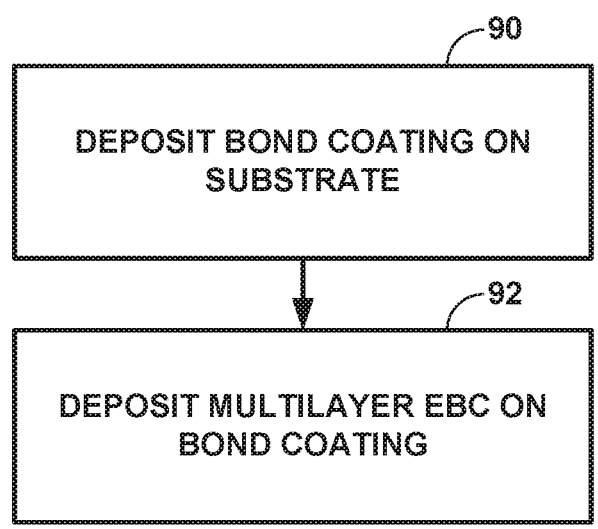
FIG. 5 is a flow diagram illustrating an example technique for forming a multilayer EBC on a substrate.

FIG. 5 is a flow diagram illustrating an example method for forming a multilayer EBC on a substrate. The method of FIG. 5 will be described with concurrent reference to article 10 of FIG. 1, article 30 of FIG. 2, article 50 of FIG. 3, and article 60 of FIG. 4; however, it will be understood that the method of FIG. 5 may be used to produce other articles, and that the articles of FIGS. 1-4 may be produced by other methods.

As shown in FIG. 5, bond coat 14 may be deposited on substrate 12 (90). In some examples, bond coat 14 may be deposited on a surface of substrate 12 using thermal spraying; a vapor phase deposition technique such as PVD, EB-PVD, DVD, or CVD; slurry deposition, or other suitable technique. A multilayer EBC, such as multilayer EBC 20 of FIGS. 1 and 2, multilayer EBC 50 of FIG. 3, or multilayer EBC 70 of FIG. 4, may be deposited on bond coat 14 (92). In some examples, the multilayer EBC may be deposited using thermal spraying (e.g., plasma spraying), slurry process deposition, vapor phase deposition, or other suitable technique.

In some examples, such as the example of FIG. 1, depositing multilayer EBC 20 may include depositing first EBC layer 16 on bond coat 14 to a first thickness and depositing second EBC layer 18 on first EBC layer 16 to a second thickness. First EBC layer 16 includes a first rare earth disilicate and a first concentration of the sintering temperature reduction agent, while second EBC layer 18 includes a second rare earth disilicate and a second concentration of the sintering temperature reduction agent, less than the first concentration of the sintering temperature reduction agent. For example, first EBC layer 16 may be deposited at a concentration of 3 wt. % of alumina and 1 wt. % of magnesium oxide and a thickness of 50 μm, while second EBC layer 18 may be subsequently deposited on first EBC layer 16 at a concentration of 0.5 wt. % of alumina and a thickness of 75 μm. In some examples, such as article 30 of FIG. 2, depositing multilayer EBC 20 may include depositing second EBC layer 18 on bond coat 14 to the second thickness and at the second concentration, and depositing first EBC layer 16 on second EBC layer 18 to the first thickness and at the first concentration. In some examples, such as article 60 of FIG. 4, depositing multilayer EBC 70 may include depositing more than two EBC layers, such as depositing third EBC layer 80 on second EBC layer 78.

In some examples, multilayer EBC 20 may be heated at a sintering temperature of multilayer EBC 20, such as during deposition or in a subsequent heat treatment. As described herein, the alumina and, optionally, alkaline earth oxide, in each of the first and second EBC layer 16 and 18 may act as sintering aids to reduce a sintering temperature of the respective EBC layer. By reducing a sintering temperature to promote sintering, each sintering temperature reduction agent-containing EBC layer may be deposited or treated to form a denser layer with fewer voids for oxidation agents to migrate or diffuse through than an EBC layer without or with a lower concentration of alumina.

The method of FIG. 5 may optionally include depositing additional layers on the multilayer EBC. For example, as shown in FIG. 3, additional coating 52 may be deposited on multilayer EBC 50 using thermal spraying; a vapor phase deposition technique such as PVD, EB-PVD, DVD, or CVD; slurry deposition, or other suitable technique.

Various examples have been described. These and other examples are within the scope of the following claims.

The invention claimed is:

1. An article comprising:
   a substrate;
   a bond coat on the substrate;
   a multilayer environmental barrier coating (EBC) on the bond coat, wherein the multilayer EBC comprises:
      a first EBC layer defining a first thickness, wherein the first EBC layer comprises a first rare earth disilicate and a first concentration of a sintering aid that comprises alumina, wherein the first concentration of the sintering aid is between 6 wt. % and 10 wt. %; and
      a second EBC layer defining a second thickness, wherein the second EBC layer comprises a second rare earth disilicate and a second concentration of the sintering aid that comprises alumina, less than the first concentration of the sintering aid, wherein the second concentration of the sintering aid is greater than 0 wt. % and less than 1 wt. %.

2. The article of claim 1, wherein the first EBC layer is on the bond coat and the second EBC layer is on the first EBC layer.

3. The article of claim 1, wherein the second EBC layer is on the bond coat and the first EBC layer is on the second EBC layer.

4. The article of claim 1, wherein at least one of the first EBC layer or the second EBC layer further comprises at least one alkaline earth oxide.

5. The article of claim 1, wherein the bond coat comprises silicon metal.

6. The article of claim 1, wherein the multilayer EBC further comprises a third EBC layer defining a third thickness, wherein the third thickness is greater than the first thickness and greater than the second thickness, wherein the third EBC layer comprises a third concentration of the sintering aid that comprises alumina that is less than the first concentration of the sintering aid that comprises alumina and less than the second concentration of the sintering aid that comprises alumina.

7. The article of claim 1, further comprising an abradable coating on the multilayer EBC.

8. The article of claim 1, wherein the second thickness is greater than the first thickness.

9. The article of claim 1, wherein the first thickness is greater than 0 μm and less than or equal to 50 μm and the second thickness is greater than 25 μm and less than or equal to 250 μm.

10. A method comprising:
depositing a bond coat on a substrate;
depositing a multilayer environmental barrier coating (EBC) on the bond coat, wherein the multilayer EBC comprises:
a first EBC layer defining a first thickness, wherein the first EBC layer comprises a first rare earth disilicate and a first concentration of a sintering aid that comprises alumina, wherein the first concentration of the sintering aid is between 6 wt. % and 10 wt. %; and
a second EBC layer defining a second thickness, wherein the second EBC layer comprises a second rare earth disilicate and a second concentration of the sintering aid that comprises alumina, less than the first concentration of alumina, wherein the second concentration of the sintering aid is greater than 0 wt. % and less than 1 wt. %.

11. The method of claim 10, wherein the first EBC layer is on the bond coat and the second EBC layer is on the first EBC layer.

12. The method of claim 10, wherein the second EBC layer is on the bond coat and the first EBC layer is on the second EBC layer.

13. The method of claim 10, wherein at least one of the first EBC layer or the second EBC layer further comprises at least one alkaline earth oxide.

14. The method of claim 10, wherein the bond coat comprises silicon metal.

15. The method of claim 10, wherein the multilayer EBC further comprises a third EBC layer defining a third thickness, wherein the third EBC layer comprises a third concentration of the sintering aid that comprises alumina that is less than the first concentration of the sintering aid that comprises alumina and more than the second concentration of the sintering aid that comprises alumina.

16. The method of claim 10, further comprising depositing an abradable coating on the multilayer EBC.

17. The method of claim 10, wherein the second thickness is greater than the first thickness.

18. The method of claim 10, wherein the first thickness is greater than 0 μm and less than or equal to 50 μm and the second thickness is greater than 25 μm and less than or equal to 250 μm.

* * * * *